United States Patent [19]

Lagervall

[11] 4,326,725
[45] Apr. 27, 1982

[54] SLEDS

[76] Inventor: Otto L. Lagervall, 724 N. 34th Ave., Yakima, Wash. 98902

[21] Appl. No.: 139,125

[22] Filed: Apr. 10, 1980

[51] Int. Cl.³ .............................................. B62B 13/12
[52] U.S. Cl. .................................... 280/22; 280/21 A
[58] Field of Search ...................... 280/22, 21 A, 21 R, 280/16, 12 R, 28, 87.01

[56] References Cited

U.S. PATENT DOCUMENTS

| | | | |
|---|---|---|---|
| 1,303,388 | 5/1919 | Reach | 280/21 A |
| 2,559,452 | 7/1951 | McLellan | 280/22 |
| 2,736,565 | 2/1956 | Forseth | 280/22 |
| 2,883,205 | 4/1959 | Dulski | 280/16 |
| 3,107,923 | 10/1963 | Nuss | 280/21 A |
| 3,360,278 | 12/1967 | Lajack | 280/21 R |
| 3,578,351 | 5/1971 | McAtee | 280/28 |

*Primary Examiner*—David M. Mitchell

[57] ABSTRACT

A wide runner, steerable, lightweight sled, and more particularly to a sled construction which incorporates the use of a pair of aluminum one piece runner extrusion, at least 2½" wide, with recessed groove along bottom center and vertical sides for stiffness, together with an aluminum channel member extrusion, which, by the nature of its design and useage, provides integral structural components in the framework of said sled, with steering means provided involving a flexing or tilting of runner members, the degree of flex diminishing rearwardly to zero, allowing the unflexed back end of runner members to slide around curves as in skiing.

2 Claims, 9 Drawing Figures

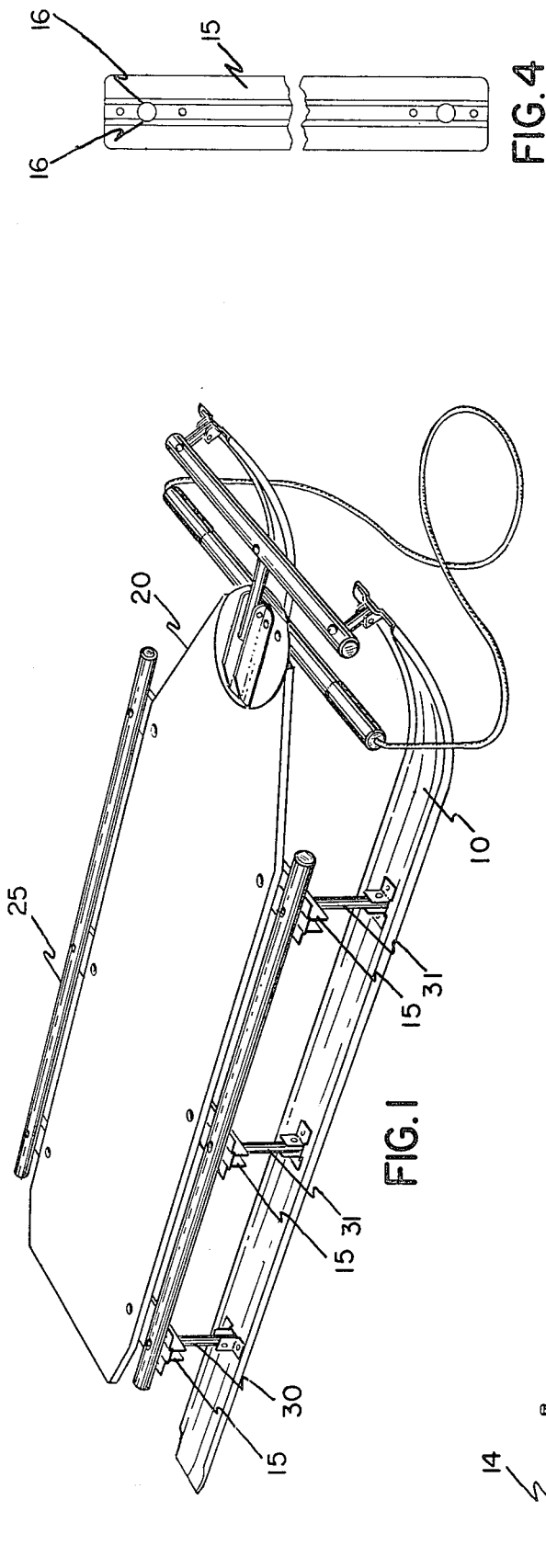
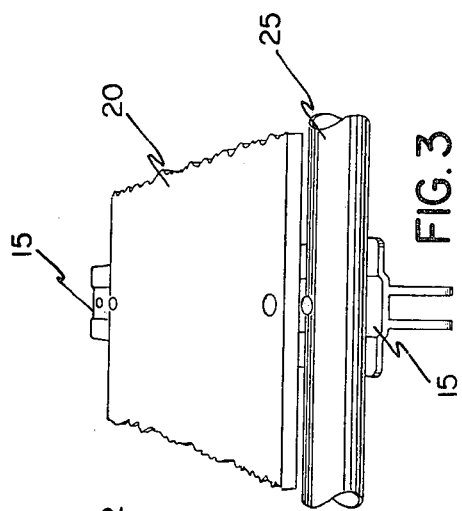
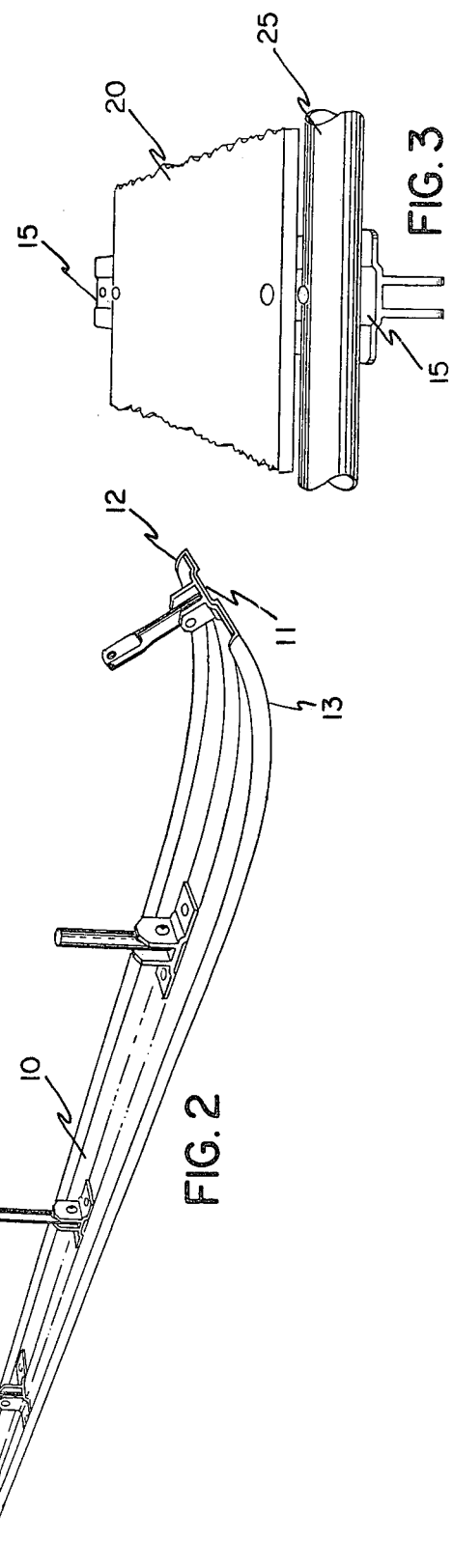

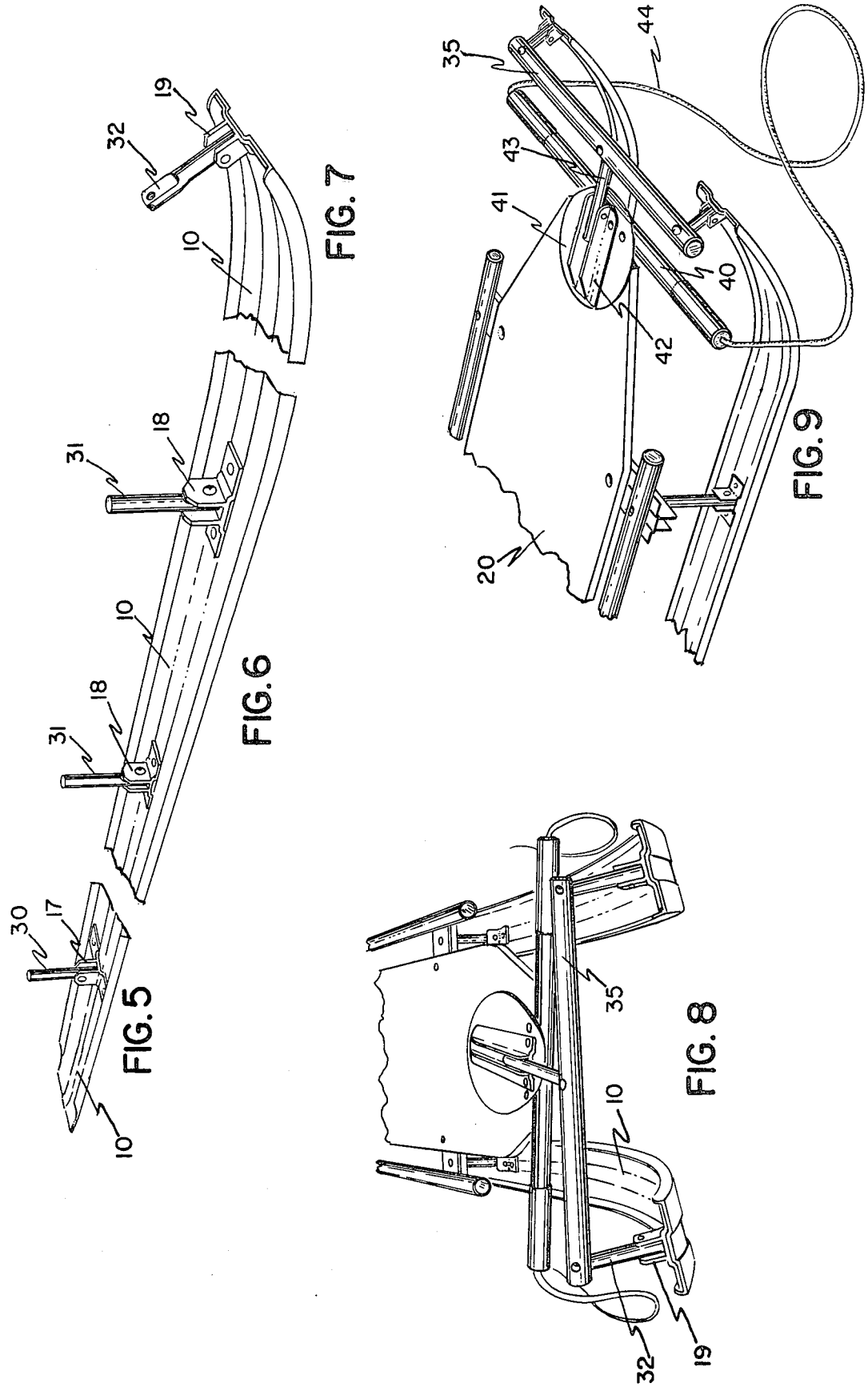

SLEDS

An object of this invention is to provide a lightweight sled of a unique construction consisting mainly of two aluminum extrusions, the runners and crossbrace channels, the latter which, when sawed in short sections, are used for various other purposes in the construction. The steering section, side rails and legs of said sled are stock items which all aluminum companies keep in stock at all times.

Another object is to provide a lightweight, steerable, wide runner sled, that, with the use of the two extrusions already stated, can be made longer or shorter, wider or narrower, by extending or shortening the runner and/or crossbrace channel extrusions, depending on sled useage, such as a rugged, maneuverable freight sled pulled by a snowmobile or sled dogs, or a longer coaster sled for carrying several persons instead of one.

A further object of said sled is the provision for safety in the design. Two rails paralleling the sides of the sled bed or platform provide a hand grip for the child or adult when sitting on the sled and steering with the feet. The steering bar of said sled does not extend outwardly beyond the overall width of sled bed or platform and side rails, thereby protecting the hands of the operator gripping each end of said steering bar when lying down on sled.

A still further object of this invention is to provide a wide runner, lightweight sled with an improved steering assembly which, as connected to runner members, includes a horizontal transversely acting thrust rod, or front tubular crossbar, that is operated directly from a steering bar fixedly secured to a circular disc unit medially pivoted on the platform or bed of sled, and steering bar handles of such length that the ends of said bar or tube do not extend horizontally outward beyond the overall width of sled platform or bed and two parallel side rails, for obvious safety reasons. The crossbrace channel, used in short sections, with channel up, previously referred to, are fixedly secured in crosswise position to runner members, providing a rigid holding device for rear legs to maintain a stationary position of rearward portion of runner members; are hingedly secured in parallel position to runner members to permit hingeing action of mid-way legs that have been milled or pressed to fit freely in channel of short sections to allow runner members to flex right or left; or fixedly secured in crosswise position of forwardly curved portion of runner members providing a rigid anchoring device for short legs, the tops of which are milled or pressed flat to fit into oval holes of front tubular crossbar, permitting front upwardly curved runner members to flex or tilt. The shape of the front portion of the sled bed or platform provides limiting control in the steering operation.

Other objects and advantages of the present invention will appear throughout the following specification and claims.

In the drawing:

FIG. 1 is a side longitudinal view of assembled sled.

FIG. 2 is a top longitudinal view of sled runner.

FIG. 3 is a fragmentary top view of sled support extrusion, with channel down, serving as crossbrace member.

FIG. 4 is a bottom view of sled support extrusion, with channel down, showing halfmoon ovals milled out from insides of channel.

FIG. 5 is a fragmentary side view section of rear end of sled runner member, showing support extrusion, with channel upward, used in a short section, fastened in a crosswise position on runner member.

FIG. 6 is a fragmentary side view mid-way section of sled runner member, showing support extrusion, with channel upward, used in short sections, fastened in a parallel position on runner member.

FIG. 7 is a fragmentary side front-end view, illustrating short section of support extrusion, with channel upward, fastened in a crosswise position on front, bent up end of runner member.

FIG. 8 is a top front view of sled, showing front short support section, with channel upward, holding short leg, connected to front tubular crossbar.

FIG. 9 shows a top side view of front end of sled, illustrating a short section of support extrusion, with channel upward, as an integral part of steering bar unit, secured to front end of bed or platform of sled, holding rod of proper length connected to front tubular crossbar.

By referring to drawings in detail, it will be seen that said sled comprises essentially two aluminum runner extrusions 10 of proper length, at least 2½" wide, with recessed lengthwise groove 11 along bottom center, vertical sides 12 for stiffness, and bent up front end 13 and slight upward rear bend 14; and an aluminum channel support extrusion 15, with channel down, as illustrated in FIG. 3, serving as integral supports, or crossbrace members for bed or platform 20 of sled, two side rails 25, used by child or adult to hold on to when sitting on sled, and a rigid holding device for top ends of legs 30 and 31. In FIG. 4 is shown halfmoon ovals 16 milled out from insides of channel support member 15 for holding top ends of legs 30 and 31. Each leg is firmly secured with two rivets or machine screws, one of which cuts into leg about 1/64", the other rivet or screw simply holding channel tight.

The aluminum channel support extrusion 15 is also used in shorter sections 17, 18, 19, with channel upward, as illustrated in FIGS. 5, 6, and 7, on both runner members 15. The short section 17 of channel support extrusion, with channel upward, is inserted in a crosswise position in runner member 10, then riveted or screwed in place to hold runner member 10 horizontally stationary at back end only, and serving as rigid holding device for bottom end of leg 30. The short sections 18 of channel support extrusion, with channel upward, are fastened in parallel position in runner member 10 to hingedly connect ends of legs 31, allowing runner member 10 to flex right or left. The bottom end of legs 31 are made thinner by milling or pressing them to fit freely between flanges of channel support sections 18, and held in place with rivets or machine screws. The rivets or machine screws should be loose enough to permit runner members 10 to flex. All of short sections 17, 18, 19 of channel support extrusion, with channel upward, except for short section 42 on front part of sled bed or platform 20, in FIG. 9, are rivetted to runner members 10 with short, countersunk rivets. Short machine screws could be used instead of rivets.

In FIG. 7, short section 19, of channel support extrusion, with channel upward, is anchored in crosswise position on front, bent up end 13 of runner member 10, so as to force runner member 10 left or right, for steering purposes. To this short section 19 is secured short leg piece 32, the top end of which is milled or pressed flat to fit into oval hole of front tubular crossbar 35, shown in FIGS. 8 and 9, permitting short leg piece 32 to flex right or left. Hardwood plugs are inserted at each end and at center of front tubular crossbar 35, with longitudinal holes milled in at each end and center permitting runner members 10 to flex, and rivets or bolts, acting as pins, are inserted at 90° in center of oval holes to hold parts.

The steering bar unit, illustrated in FIG. 9, consists of a tube 40 of proper length, with rope 44 held in place in each end of tube 40, for purposes of steering and pulling sled, fastened to circular disc 41 and short section 42 of channel support extrusion, with channel upward, secured to sled bed or platform 20 with bolt in exact center, permitting steering bar unit to rotate. A rod, or short leg 43 is held in short section 42 of channel support extrusion with rivet or bolt. The very front end of rod 43 is flattened so as to fit freely in oval hole of very front tubular crossbar 35, so that runner members 10 will flex simultaneously.

Having described the invention, what I claim as new is:

1. A lightweight, wide runner, steerable sled comprising:

a pair of aluminum extruded runners, each having an upwardly turned forward portion and a longitudinally extending guide groove in its bottom surface, said runners being at least 2½ inches wide and having short vertically upward side walls;

a planar support bed or platform;

a steering means at front of bed for tilting and flexing said runners;

at least two extruded support channels, transversely extending beneath and fixedly secured to said bed and side rails;

transversely spaced leg rods, interconnecting said support channels and said runners, the upper ends of said leg rods being rigidly anchored in said support channel;

a rearward pair of said leg rods having their lower ends rigidly secured to said runner by a short section of upwardly open channel member;

at least one medial pair of leg rods having their lower ends hingedly connected to said runners about a longitudinal axis through short sections of upwardly open channel members;

a pair of short leg rods having their lower ends rigidly secured at said upturned forward portion of said runners by upwardly extending channel members, the upper ends of said short legs being flattened;

said steering means including a tubular cross bar having transversely elongated oval holes for pivotally receiving said flattened upper ends of said short legs.

2. A steerable sled as in claim 1, wherein said steering means includes a steering bar interconnected with said thrust bar, said steering bar having a transverse extent less than width of said bed and side rails combined;

a circular disc pivoted on said bed about a vertical axis and fixedly connected to said steering bar.

* * * * *